(12) United States Patent  (10) Patent No.: US 8,666,660 B2
Sartipi et al.  (45) Date of Patent: Mar. 4, 2014

(54) METHOD, SYSTEM AND APPARATUS FOR DETERMINING GEOFENCE DATA BASED ON ESTIMATED TIME OF ARRIVAL

(75) Inventors: Siamak Sartipi, Waterloo (CA); Jason Christopher Beckett, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 43 days.

(21) Appl. No.: 13/276,414

(22) Filed: Oct. 19, 2011

(65) Prior Publication Data

US 2013/0103307 A1  Apr. 25, 2013

(51) Int. Cl.
 *G08G 1/123* (2006.01)
(52) U.S. Cl.
 USPC ............................................... 701/465
(58) Field of Classification Search
 USPC ............................................... 701/465
 See application file for complete search history.

(56) References Cited

U.S. PATENT DOCUMENTS

| 5,911,773 | A | 6/1999 | Mutsuga et al. |
| 7,561,063 | B2 * | 7/2009 | Eckhart ........................ 340/901 |
| 2006/0242009 | A1 | 10/2006 | Crolley |
| 2006/0284767 | A1 | 12/2006 | Taylor |
| 2008/0214156 | A1 | 9/2008 | Ramer et al. |
| 2009/0055091 | A1 | 2/2009 | Hines et al. |
| 2009/0138445 | A1 * | 5/2009 | White et al. ........................ 707/3 |
| 2009/0228467 | A1 | 9/2009 | Asanuma |
| 2010/0088018 | A1 | 4/2010 | Tsurutome et al. |
| 2010/0161215 | A1 | 6/2010 | Karani |
| 2011/0070872 | A1 * | 3/2011 | Ellanti et al. ................ 455/414.2 |
| 2012/0276928 | A1 * | 11/2012 | Shutter ........................ 455/456.3 |

FOREIGN PATENT DOCUMENTS

| WO | 20080156439 A1 | 6/2007 |
| WO | 2008/123851 A1 | 10/2008 |

OTHER PUBLICATIONS

Descartes Wireless/GPS—Gain Real-Time Access and Control of Your Vehicles and Deliveries.
Corresponding European Patent Application No. 11185730.6 Search Report dated May 8, 2012.

* cited by examiner

*Primary Examiner* — James Trammell
*Assistant Examiner* — Michael D Lang
(74) *Attorney, Agent, or Firm* — Perry + Currier Inc.

(57) ABSTRACT

An apparatus, method, and system for determining geofence data based on estimated time of arrival are provided. At a computing device, geofence data is determined, wherein geographic boundaries associated with the geofence data are based on a given estimated time of arrival (ETA) from one of the given location and a current location of a handheld communication device. Given location data associated with the given location is transmitted to the handheld communication device, via a communication interface, when the current location of the handheld communication device and the given location are each within the geographic boundaries such that the handheld communication device is transportable to the given location within the given estimated time of arrival.

19 Claims, 8 Drawing Sheets

METHOD, SYSTEM AND APPARATUS FOR DETERMINING GEOFENCE DATA BASED ON ESTIMATED TIME OF ARRIVAL

FIELD

The specification relates generally to computer systems, and specifically to a method, system and apparatus for determining geofence data based on estimated time of arrival.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
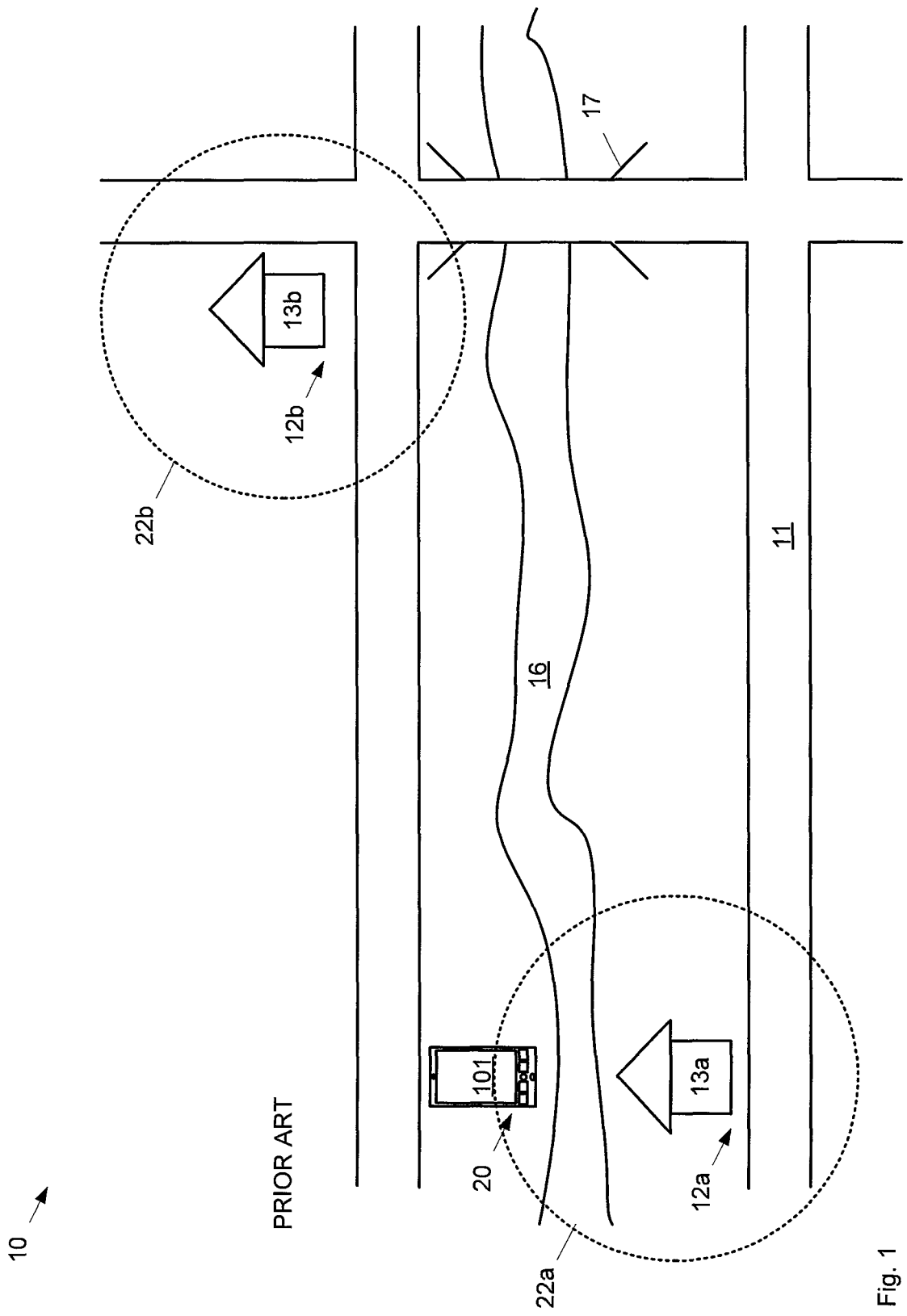
FIG. 1 depicts a map including geofences, according to the prior art.

An aspect of the specification provides a computing device comprising: a memory; a communication interface enabled to communicate with a handheld communication device; and a processor enabled to: determine geofence data, wherein geographic boundaries associated with the geofence data are based on a given estimated time of arrival (ETA) from one of a given location and a current location of the handheld communication device; and transmit to the handheld communication device, via the communication interface, given location data associated with the given location when the current location of the handheld communication device and the given location are each within the geographic boundaries such that the handheld communication device is transportable to the given location within the given estimated time of arrival.

The given ETA can be from the given location, the geographic boundaries of the geofence data can surround the given location, and the given location data associated with the given location can be transmitted to the handheld communication device when the current location of the communication device is within the geographic boundaries. The memory can store registration data associated with the handheld communication device, and the processor can be further enabled to transmit the given location data to the handheld communication device only when the registration data is indicative that the handheld communication device is registered to receive data associated with the given location. The given location data can comprise offer data associated with the given location.

The processor can be further enabled to transmit to the handheld communication device, via the communication interface, the given location data in a push operation.

The processor can be further enabled to: receive, via the communication interface, search parameter data from the handheld communication device; and perform a search based on the search parameter data to produce search results data, wherein, the given ETA can be from the current location of the handheld communication device, the geographic boundaries of the geofence data can surround the current location of the handheld communication device, and the search results data can comprise the given location data, the search results data comprising only results associated with given locations within geographic boundaries associated with the geofence data, including the given location. The search results can be sorted according to a respective ETA associated with each of the given locations.

The processor can be further enabled to transmit to the handheld communication device, via the communication interface, the search results data in a pull operation.

The geographic boundaries can comprise a polygon.

The geographic boundaries can be based on one or more of present traffic conditions, historical traffic conditions, data received from a map server, and data received from a traffic server.

Another aspect of the specification provides a method comprising: determining geofence data, at a computing device in communication with a handheld communication device, wherein geographic boundaries associated with the geofence data are based on a given estimated time of arrival (ETA) from one of a given location and a current location of the handheld communication device (101); and transmitting to the handheld communication device, via the communication interface at the computing device, given location data associated with the given location when the current location of the handheld communication device and the given location are each within the geographic boundaries such that the handheld communication device is transportable to the given location within the given estimated time of arrival.

The given ETA can be from the given location, the geographic boundaries of the geofence data can surround the given location, and the given location data associated with the given location can be transmitted to the handheld communication device when the current location of the communication device is within the geographic boundaries. A memory of the computing device can stores registration data associated with the handheld communication device, and the method can further comprise transmitting the given location data to the handheld communication device only when the registration data is indicative that the handheld communication device is registered to receive data associated with the given location. The given location data can comprise offer data associated with the given location.

The method can further comprise transmitting to the handheld communication device, via the communication interface, the given location data in a push operation.

The method can further comprise: receiving, via the communication interface, search parameter data from the handheld communication device; and performing a search based on the search parameter data to produce search results data, wherein, the given ETA can be from the current location of the handheld communication device, the geographic boundaries of the geofence data can surround the current location of the handheld communication device, and the search results data can comprise the given location data, the search results data comprising only results associated with given locations within geographic boundaries associated with the geofence data, including the given location. The search results can be sorted according to a respective ETA associated with each of the given locations.

The method can further comprise transmitting to the handheld communication device, via the communication interface, the search results data in a pull operation.

The geographic boundaries can comprise a polygon.

The geographic boundaries can be based on one or more of present traffic conditions, historical traffic conditions, data received from a map server, and data received from a traffic server.

Yet a further aspect of the specification provides a computer program product, comprising a computer usable medium having a computer readable program code adapted to be executed to implement a method comprising: determining geofence data, at a computing device in communication with a handheld communication device, wherein geographic boundaries associated with the geofence data are based on a given estimated time of arrival (ETA) from one of a given location and a current location of the handheld communication device (101); and transmitting to the handheld communication device, via the communication interface at the computing device, given location data associated with the given location when the current location of the handheld communication device and the given location are each within the geographic boundaries such that the handheld communication device is transportable to the given location within the given estimated time of arrival.

FIG. 1 depicts a map 10, including, roads 11, a first geographic location 12a where a first entity 13a is located, a second geographic location 12b where a second entity 13b is located, a river 16, and a bridge 17 over river 16. Map 10 further includes a current location 20 of a mobile communication device 101. First geographic location 12a and second geographic location 12b will also be generically referred to hereafter as a location 12 and collectively referred to as locations 12. This convention will be used throughout the present specification. Mobile communication device 101 will also be referred to hereafter as device 101.

In some applications, a remote computing device (similar to server 105 of FIG. 2, described in more detail below) can determine a location of device 101 in order to transmit given location data to device 101 via a suitable communications network. For example, such a remote computing device can be enabled to provide location based services (LBS) such as transmitting offer data (e.g. electronic coupons, electronic discounts, electronic notices that device 101 is close to a given entity at a given location, electronic notices of sales at the given location, electronic directions to a given location or the like) to device 101 when device 101 is within a given distance of a given location, such as one or more of locations 12. In these instances, the remote computing device determines respective distance-based geofences around one or more of locations 12, and transmits the offer data to device 101 when device 101 is within the geographic boundaries associated with a respective geofence. For example, when device 101 is within 1 kilometre of location 12a, the remote computing device can transmit electronic offer data to device 101. It is further appreciated that the term given location refers to a location associated with an entity 13 (such as location 12), while the term current location refers to a location of device 101, such as location 20.

FIG. 1 further depicts geofences 22a, 22b respectively surrounding locations 12a, 12b, and it is appreciated that location 20 is within the geographical boundaries of geofence 22a, but not within geofence 22b. Hence, offer data associated with location 12a will be transmitted to device 101, but offer data associated with location 12b will not be transmitted to device 101. In other words, location 20 of device 101 is closer in distance to location 12a than location 12b. However, as location 12a is across river 16 from location 20, a travel time from location 20 to location 12a is greater than a travel time from location 20 to location 12b. Hence received offer data associated with location 12a will not be as relevant and/or as useful to device 101 as unreceived offer data associated with location 12b.

Similarly, when device 101 initiates a search for entities via the remote computing, a geofence (not depicted) can be determined around device 101, and entities 13 within the geofence can be provided in search results while entities 13 outside the geofence surrounding device 101 can be omitted from the search results. Alternatively, when both entities are within the geofence, the search results can be ordered with respect to distance from location 20. In either case, the most relevant search results are either omitted or improperly prioritized in the provided search results as a travel time from location 20 to entity 13b at location 12b is shorter than a travel time from location 20 to entity 13a at location 12a, even though the distance between location 20 and location 12a is shorter than a distance between location 20 and location 12b.

Figure 2:
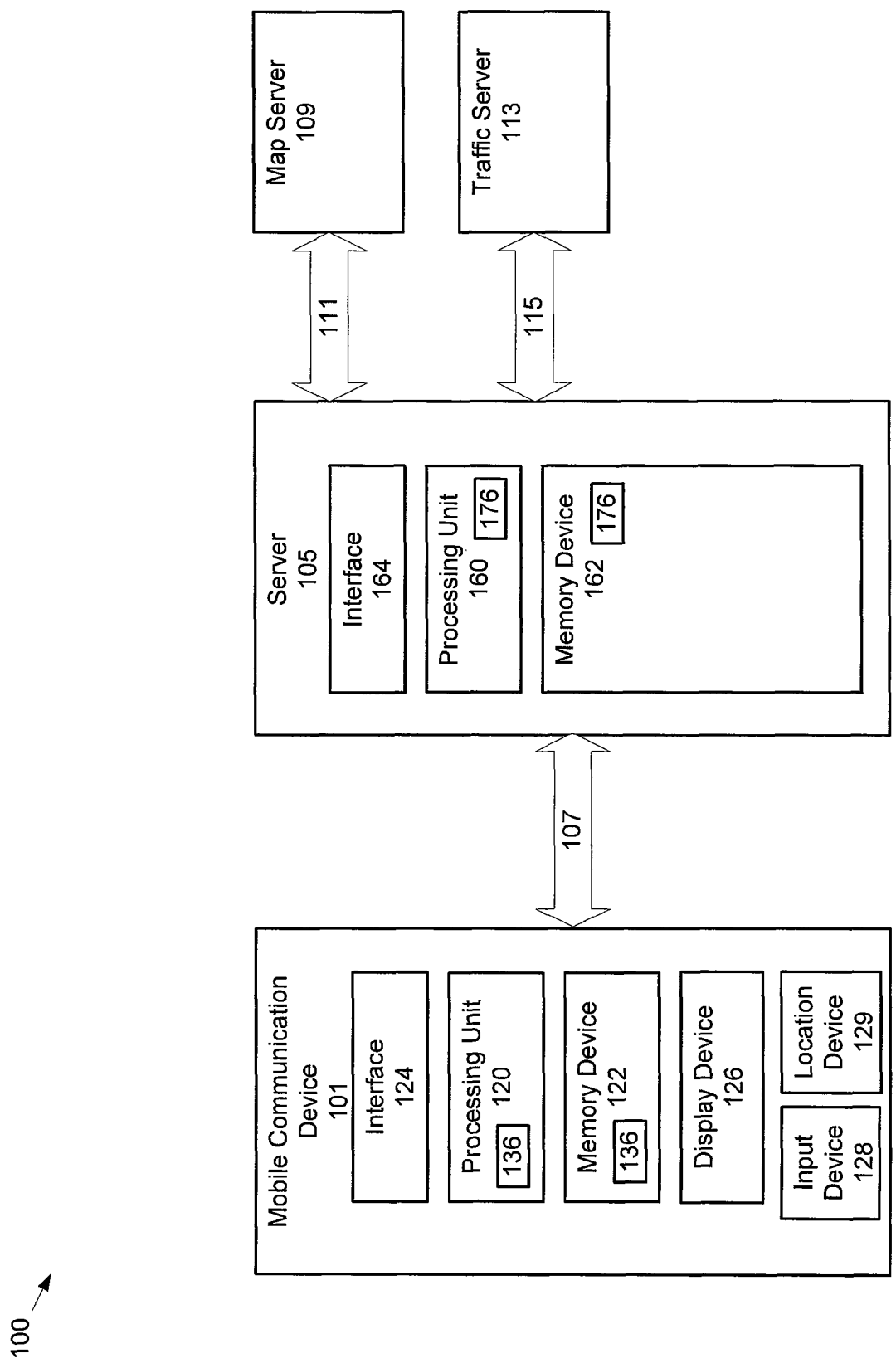
FIG. 2 depicts a system for determining geofence data based on estimated time of arrival, according to non-limiting implementations.

Hence, attention is now directed to FIG. 2, which depicts a system 100 for determining geofence data based on estimated time of arrival (ETA), rather than distance. System 100 comprises device 101 and a server 105 in communication via a link 107. Device 101 comprises a processing unit 120 in communication with a memory device 122, a communication interface 124, a display device 126, an input device 128, and a location device 129 for example via a computing bus (not depicted). Memory device 122, communication interface 124, and display device 126 will also be referred to hereafter as, respectively, memory 122, interface 124 and display 126. Device 101 further comprises an application 136 for receiving and displaying data received from server 105. Application 136 can be stored in memory 122 and processed by processing unit 120.

Similarly server 105 comprises a processing unit 160 in communication with a memory device 162, and a communication interface 164, for example via a computing bus (not depicted). Memory device 162 and communication interface 164 will also be respectively referred to hereafter as memory 162 and interface 164. Server 105 further comprises an application 176 for determining geofence data based on ETA from one of a given location and a current location of device 101. Application 176 can be stored in memory 162 and processed by processing unit 160.

In some implementations, server 105 is enabled to communicate with one or more of a map server 109, via a link 111, and a traffic server 113 via a link 115. In other implementations, server 109 can be enabled with the functionality of one or more map server 109 and traffic server 111.

In general, device 101 comprises any suitable portable electronic device enabled to communicate with server 105, including but not limited to any suitable combination of laptop computing devices, portable computing device, mobile electronic devices, PDAs (personal digital assistants), cellphones, smartphones and the like. Other suitable electronic devices are within the scope of present implementations.

Server 105 can be based on any well-known server environment including a module that houses one or more central processing units, volatile memory (e.g. random access memory), persistent memory (e.g. hard disk devices) and network interfaces to allow server 105 to communicate over links 107, 111, 115. For example, server 105 can comprise a ProLiant® Server from Hewlett-Packard Company, 3000 Hanover Street Palo Alto, CA. 94304-1185 USA having a plurality of central processing units and having several gigabytes of random access memory. However, it is to be emphasized that this particular server is merely a non-limiting example, and a vast array of other types of computing environments for server 105 are contemplated. Furthermore, it is contemplated that server 105 can be implemented as a plurality of interconnected servers, in a so-called server farm, which are mirrored or otherwise configured for load balancing or failover or high availability or any or all of those. It is further appreciated that each of map server 109 and traffic server 113 can be similar to server 105. In some implementations, map server 109 and traffic server 113 are further enabled to communicate with each other.

Link 107 comprises any suitable link between device 101 and server 105, including any suitable combination of wired and/or wireless links, wired and/or wireless devices and/or wired and/or wireless networks, including but not limited to any suitable combination of USB (universal serial bus) cables, serial cables, wireless links, cell-phone links, wireless data, Bluetooth links, NFC (near field communication) links, WiFi links, WiMax links, packet based links, the Internet, analog networks, the PSTN (public switched telephone network), access points, and the like, and/or a combination. However, it is appreciated that at least a portion of link 107 that is linked to device 101 is wireless as device 101 is mobile and enabled to communicate with server 105 while being transported. Other suitable communication link and/or devices and/or networks are within the scope of present implementations. It is further appreciated that links 111, 115 are similar to link 107, however there is no restriction that at least a portion of links 111, 115 be wireless. Any link between map server 109 and traffic server 113 can be similar to one or both of links 111, 115.

Processing unit 120 comprises any suitable processor, or combination of processors, including but not limited to a microprocessor, a central processing unit (CPU) and the like. Other suitable processing units are within the scope of present implementations.

Device 101 includes at least one input device 128. Input device 200 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors). Processor 120 is configured to communicate with memory 122, which can comprise one or more of a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in the non-volatile storage unit and used by processor 120 which makes appropriate utilization of the volatile storage unit during the execution of such programming instructions. Those skilled in the art will now recognize that memory 122 is an example of non-transitory computer readable media that can store programming instructions executable on processor 120. It is further appreciated that memory 122 is also an example of memory units and/or memory modules.

In general, memory 122 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory 122 is enabled to store application 136.

Communication interface 122 comprises any suitable communication interface, or combination of communication interfaces. In particular communication interface 122 is enabled to communicate with server 105 via link 107 using any suitable wireless protocol. Accordingly, communication interface 122 is enabled to communicate according to any suitable protocol which is compatible with link 107, including but not limited to wireless protocols, cell-phone protocols, wireless data protocols, Bluetooth protocols, NFC (near field communication) protocols, packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations. It is further appreciated that interface 122 can be implemented as one or more radios configured to communicate over link 107. In general, it will be understood that interface 122 is configured to correspond with the network architecture that is used to implement link 107. (In other implementations a plurality of links 107 with different protocols can be employed by device 101 and thus a plurality of interfaces can be provided to support each link.).

Display 126 comprises any suitable one of or combination of CRT (cathode ray tube) and/or flat panel displays (e.g. LCD (liquid crystal display), plasma, OLED (organic light emitting diode), capacitive or resistive touchscreens, and the like).

Device 101 further comprises location device 129, comprising any suitable combination of hardware and software for determining a location of device 101. For example, location device 129 can comprise a GPS (Global Positioning System) device, a triangulation device, triangulation software and the like. It is appreciated that processor 120 is interconnected with location device 129 such that processor 120 can retrieve a present location from location device 129 and thereby determine the present location.

In any event, it should be appreciated that in general a wide variety of configurations for device 101 are contemplated.

Figure 3:
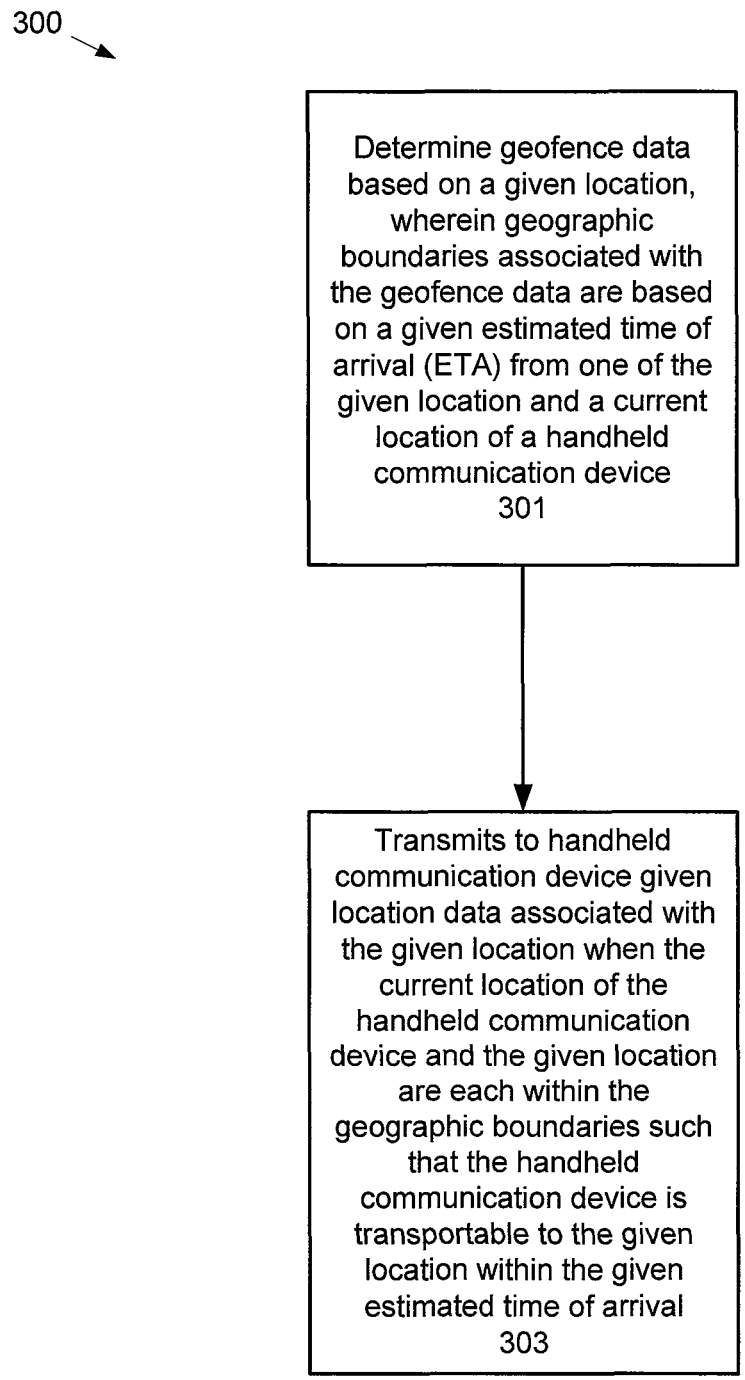
FIG. 3 depicts a method for determining geofence data based on estimated time of arrival, according to non-limiting implementations.

Attention is now directed to FIG. 3 which depicts a method 300 for determining geofence data based on estimated time of arrival. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations. In particular, it is appreciated that method 300 is implemented in system 100 by processing unit 160 of server 105.

At block 301, server 105 determines geofence data, wherein geographic boundaries associated with the geofence data are based on a given estimated time of arrival (ETA) from one of the given location and a current location of the hand-held communication device. At block 303, server 105 transmits to device 101, via interface 164, given location data associated with the given location when the current location of the device 101 and the given location are each within the geographic boundaries such that device 101 is transportable to the given location within the given estimated time of arrival.

Applications of method 300 will now be described with reference to several non-limiting implementation.

In some non-limiting implementations, the given ETA is from the given location, such as one of locations 12, the geographic boundaries of the geofence data surround the given location, and the given location data associated with the given location is transmitted to device 101 when current location 20 of device 101 is within the geographic boundaries. In some of these implementations, memory 162 stores registration data associated with device 101, and processor 160 is further enabled to transmit the given location data to device 101 only when the registration data is indicative that device 101 is registered to receive data associated with the given location. For example, the given location data can comprise offer data associated with the given location.

Figure 4:
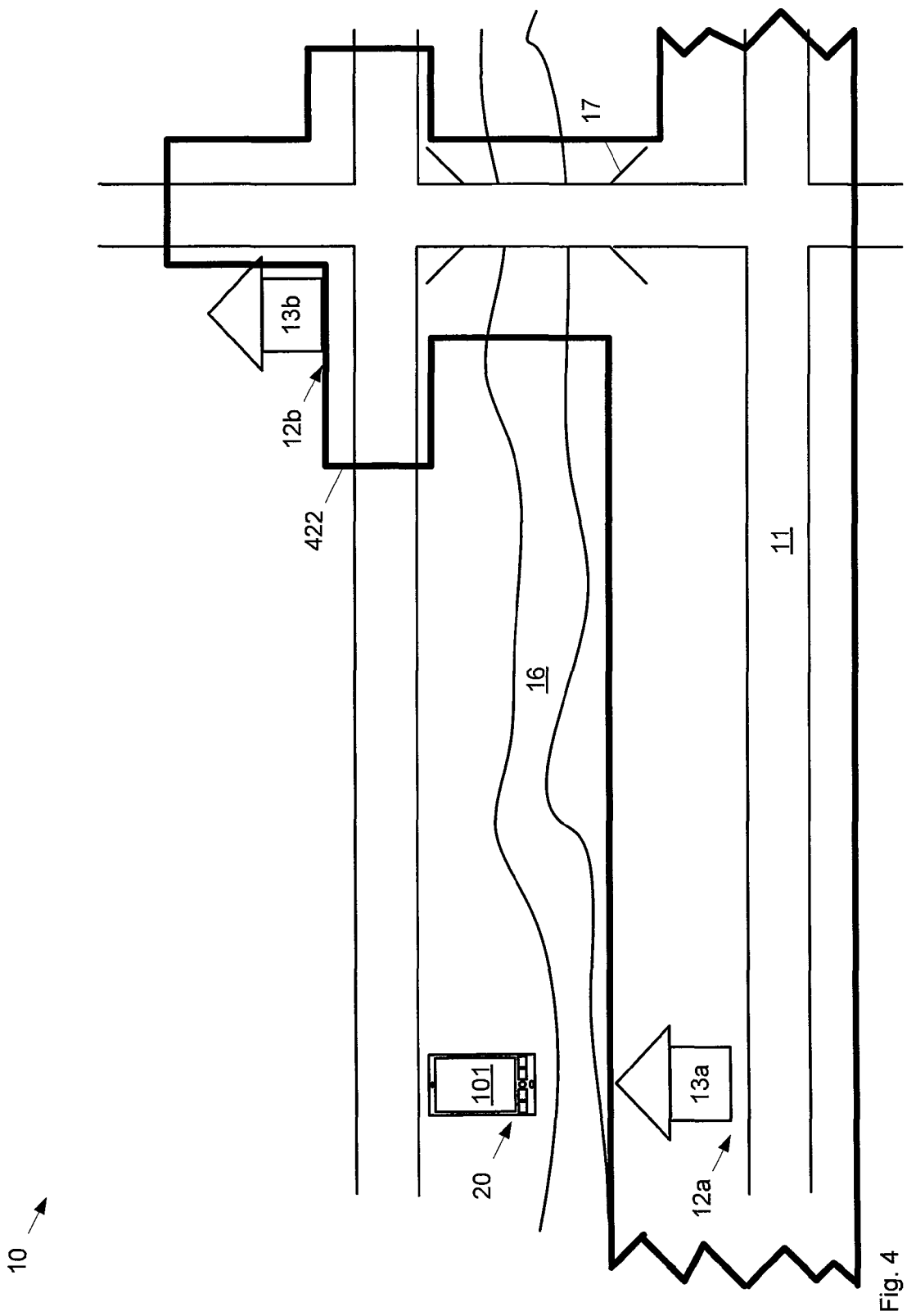
FIG. 4 depicts a map including a geofence based on estimated time of arrival, according to non-limiting implementations.
Figure 5:
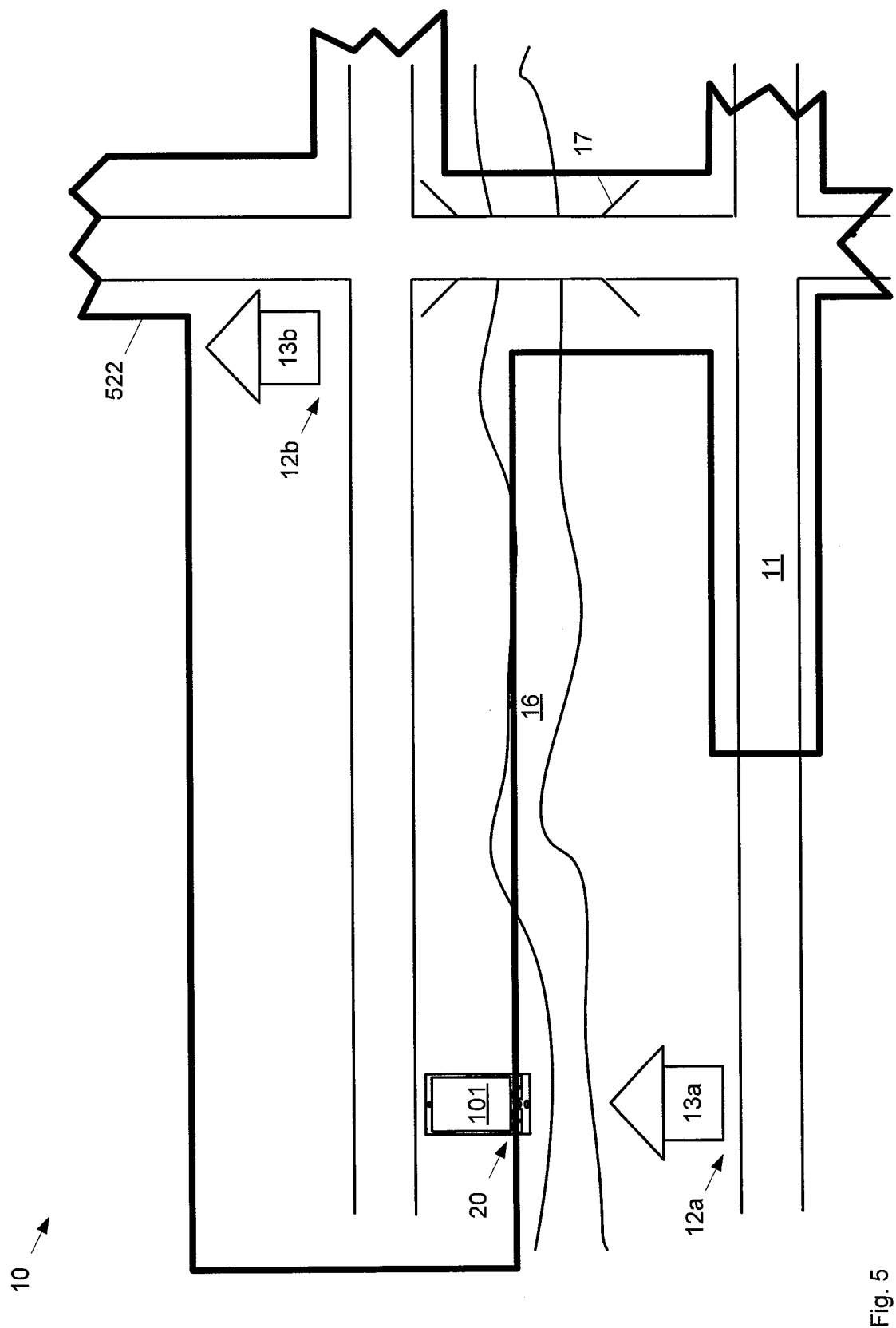
FIG. 5 depicts a map including a geofence based on estimated time of arrival, according to non-limiting implementations.
Figure 6:
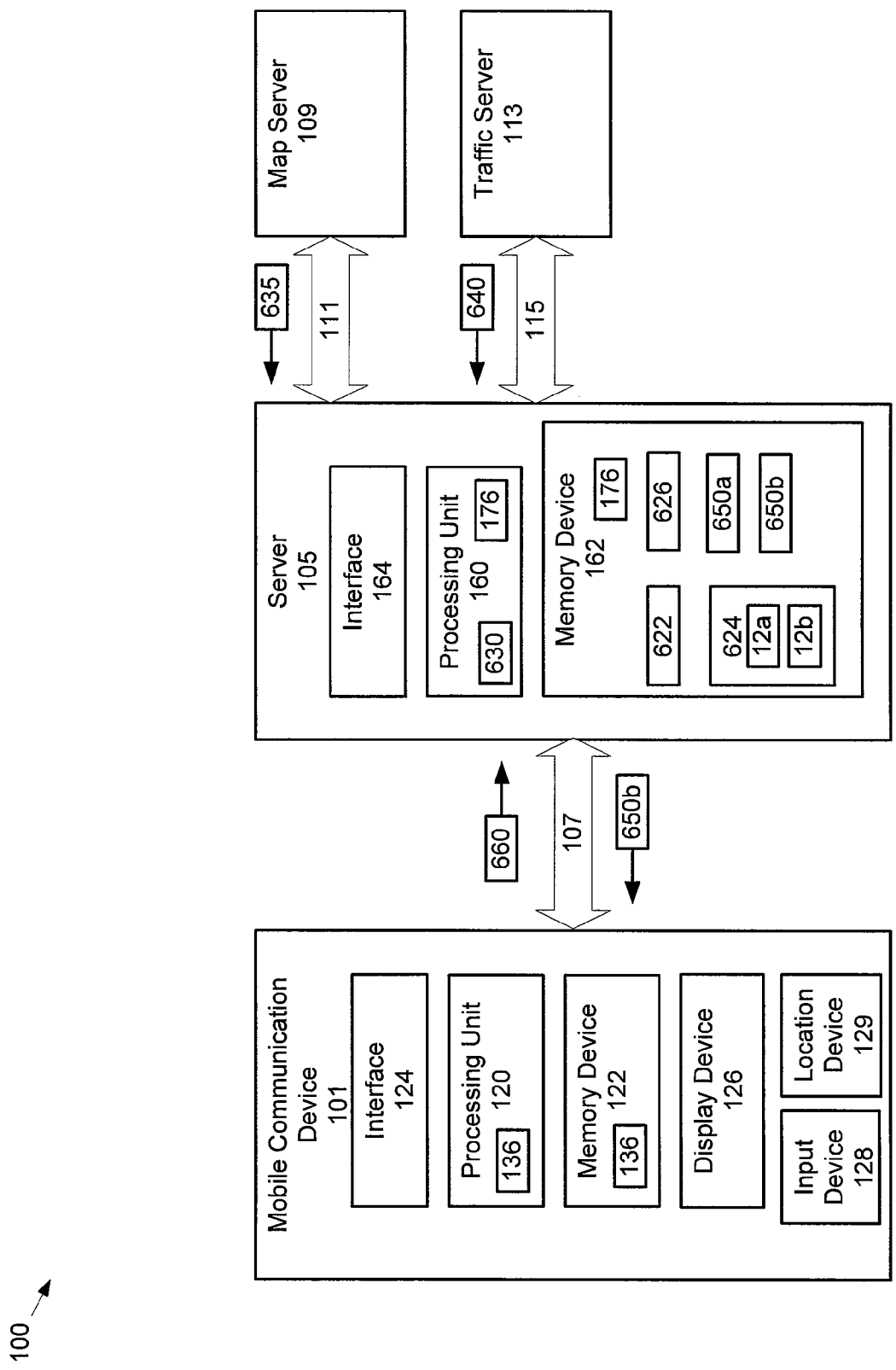
FIG. 6 depicts a system for determining geofence data based on estimated time of arrival, according to non-limiting implementations.

To illustrate these implementations, attention is directed to FIGS. 4, 5 and 6, which depict non-limiting implementations incorporating location-based advertising such at with an ETA-based geofence can be around a given location. In these implementations, participating entities would like to offer electronic offers and the like to users who are close by. FIG. 4 is substantially similar to FIG. 1, with like elements having like numbers, however an ETA-based geofence 422 is provided around location 12a. It appreciated that the full geographic boundaries of geofence 422 are not depicted in FIG. 4, but extend past the depicted jagged lines of geofence 422. In any event, geofence 422 represents the geographic boundaries of where a given device could be located and transported to location 12a within a given estimated time period, such as 5 minutes.

FIG. 5 is substantially similar to FIG. 1, with like elements having like numbers, however an ETA-based geofence 522 is provided around location 12b. It appreciated that the full geographic boundaries of geofence 522 are not depicted in FIG. 5, but extend past the depicted jagged lines of geofence 522. In any event, geofence 522 represents the geographic boundaries of where a given device could be located and transported to location 12b within a given estimated time period, such as 5 minutes.

FIG. 6 is substantially similar to FIG. 2, with like elements having like numbers, however memory 162 further stores registration data 622 associated with device 101. For example, registration data 622 can be stored in a provisioning process wherein device 101 registers with server 101 to receive offers associated with at least one of entities 13; for example, registration data 622 can comprise an identifier of device 101 stored in association with one or more identifiers of entities 13. Memory 162 further stores location data 624 comprising one or more of locations 12 (e.g. in GPS coordinates or the like). Memory 162 further stores given ETA data 626, such as a given driving time to a given location, such as one or more of locations 12; for example, given ETA data 626 can comprise a time of "5 minutes" in any suitable format. Each of location data 624, and given ETA data 626 can be stored in memory 162 in a provisioning process.

In these implementations, geofence data 630 can be generated by querying map server 109 to receive map data 635 via link 111, for example using location data 624 as input to map server 109; in other words, map data 635 includes a given location 12 (i.e. one of locations 12a, 12b), and can, for example, be centered on a given location 12. In some alternative implementations, geofence data 630 can be further generated by querying traffic server 113 to receive traffic data 640 via link 115, for example using map data 635 as an input to traffic server 113. Traffic data 640 comprises data indicative of traffic patterns on roads 11, including but not limited to estimated driving times from the given location 12 along roads 11. In some implementations traffic data 640 comprises current traffic data obtained via monitoring of sensors embedded in roads 11 and/or from estimated traffic patterns from observation of roads 11 (e.g. via cameras etc.). In other implementations, traffic data 640 can comprise historical traffic data based on historical traffic patterns on roads 11. While possibly not as accurate as traffic data based on sensors and/or monitoring, historical traffic data can be faster to generate.

In any event, server 105 determines geofence data 630 based on map data 635, given ETA data 626, and optionally traffic data 640. Server 105 can also take into account an average driving speed along roads 11 and/or speed limits along roads 11 when determining geofence data 630. With reference to FIG. 4, and assuming that the given location 12 comprises location 12a, it is appreciated that geofence data 630 comprises data representative of geofence 422. In other words, geofence data 630 is representative of geographic boundaries that can be reached within 5 minutes by driving a vehicle to location 12a along roads 11. Comparing ETA based geofence 422 to with distance base geofence 22a, it is appreciated that device 101 is outside the geographical boundaries of geofence 422 even though device 101 is within the geographical boundaries of geofence 22a.

Attention is next directed to FIG. 5, which depicts geofence 522 around given location 522. Comparing ETA based geofence 422 to with distance base geofence 22b, it is appreciated that device 101 is within the geographical boundaries of geofence 522 even though device 101 is outside the geographical boundaries of geofence 22b.

Attention is next directed to FIG. 6, wherein given location data 650a, 650b is stored in memory 162. It is appreciated that given location data 650a comprises location data associated with location 12a and/or entity 13a, while given location data 650b comprises location data associated with location 12b and/or entity 13b. Each set of data 650 can include, but is not limited to, offer data, electronic coupons, electronic discounts, electronic notices that device 101 is close a given entity at the given location, electronic notices of sales at the given location, electronic directions to a given location or the like.

In any event, server 105 determines a location of device 101, for example by receiving current location data 660 from device 101 in at least one of push and pull operation between device 101 and server 105. For example current location data, 660 comprising a current location 20 of device 101, can be generated by location device 129 and transmitted to server 105 via interface 124. Transmission of current location data 660 can occur periodically and/or on as requested basis.

When server 105 receives current location data 660, server 105 then compares current location data 660 to the geographic boundaries of geofence data 630 (e.g. a geofence around location 12b). When current location 660 of device 101 is within the geographic boundaries of geofence data 630 (e.g. such that device 101 is transportable to location 12b within a given estimated time of arrival), given location data 650 associated with geofence data 630 is transmitted device 101, via interface 164. For example, when current location data 20 is received, processor 160 compares current location data 660 to geofence data associated with geofence 422 and geofence 522 to determine when device 101 is within either geofence 422 and/or geofence 522. When device 101 is within a given geofence (e.g. within geofence 522 as in FIG. 5) the corresponding given location data 650b is transmitted to device 101, as depicted in FIG. 6. As device 101 is not within geofence 422, given location data 650a is not transmitted to device 101. For example, an ETA-based geofence can hence be set around a point-of-interest (POI) (such as a coffee shop) and offer deals to users/devices within a certain ETA. This would make the deal more relevant since the user is within a certain time from the storefront rather than a certain distance. This has the potential of increasing conversion rates (i.e. rate at which an electronic offer is redeemed, thereby bringing users to the POI).

This contrasts with what would have happened had geofences 22 been used to determine whether to transmit given location data 650: in this instance, given location data 650a would have been transmitted rather than given location data 650b, and device 101 could have been directed to geographically closer location 12a, passing by location 12b on the way.

It is appreciated that geofence data 630 can be generated periodically and/or upon request and/or upon receiving current location data 660. For example, geofence data 630 can be generated several times a day. Furthermore, once geofence data 630 is generated, geofence data 620 can be dynamically adjusted based on traffic conditions, by querying traffic server 113 (e.g. periodically) and receiving updated traffic data, similar to traffic data 640 but for a current given time period.

In general it is appreciated transmission of given location data 650 can occur within a given time period of generating geofence data 630 such that given location data 650 and geofence data 630 is current with respect to a location of device 101. However, a tradeoff can occur between when geofence data 630 is generated and processing of server 105. For example, the more often geofence data 630 is generated, the more accurate geofence data 630 will be with respect to current traffic conditions, however this can be processing intensive. Alternatively, traffic data 640 can comprise historical traffic data rather then current traffic data (e.g. average traffic patterns on roads 11 at different times of day), and geofence data 630 can be generated once for a given number of time periods throughout a day (for example every hour, every half hour and the like), and stored at server 105. Hence, when current location data 660 is received, geofence data 630 is not regenerated, but a previously generated set of geofence data associated with a closest time of day is used to determine whether to transmit given location data 650.

It is further appreciated that geofence data 630 can be generated for any suitable number of locations and/or entities, and device 101 can register to receive given location data associated with any suitable number of locations and/or entities. In these implementations, server 105 tracks the location of device 101 and transmits given location data 650 whenever device 101 enters a given geofence, such as geofences 422, 522. In other words, server 105 is monitoring traffic into and out of ETA based geofences 422, 522, and transmitting electronic offer data to devices that are within a given ETA of respective locations 12a, 12b.

It is further appreciated that server 105 transmits given location data 660 in a push operation.

In general then, it is appreciated that in the non-limiting example provided with reference to FIGS. 4-6, processing unit 160 is enabled to: determine geofence data 630 based a given estimated time of arrival (ETA) to given location 12b; and transmit, via interface 164, to device 101 given location data 650b associated with given location 12b when a current location 20 of device 101 and given location 12b are each within the geographic boundaries (e.g. geofence 522) such that device 101 is transportable to given location 12b within the given estimated time of arrival. In these non-limiting examples, geo fences are provided around points of interest and electronic offer data transmitted to devices that enter the geofence. In some implementations, location data 650b can be transmitted only when memory 162 stores registration data indicative that device 101 is registered to receive given location data associated with a given location.

In alternative implementations, an ETA based geofence surrounding device 101 can be determined and electronic offer data can transmitted to device 101 when a given location is within the geofence surrounding device 101. In these implementations, processing unit 160 can be enabled to: determine geofence data based on a current location of device 101 and a given estimated time of arrival (ETA) from the current location; and transmit, via interface 164, to device 101 given location data associated with a given location when the current location of the device 101 and the given location are each within the geographic boundaries such that device 101 is transportable to the given location within the given estimated time of arrival. In some implementations, location data 650b can be transmitted only when memory 162 stores registration data indicative that device 101 is registered to receive given location data associated with a given location.

A similar application can be provided in along-route advertising using ETA based geofences. For example, server 105 could also check for locations and/or entities associated with given location data 650 (including but not limited to advertising partners) along a route being taken by device 101 (i.e. based on updated current location data) and calculate ETA based geofences along the route. Server 105 could be further enabled to transmit given location data 650 to device 101 based on any suitable algorithm, including but not limited to: when device 101 enters a given geofence; prior to device 101 entering a given geofence which can optionally based on an estimate of when device 101 might enter a given geofence; profiling of a user associated with device 101; favourite brands associated with a user of device 101; transaction history; or the like. In implementations where profiling, favourite brands and transaction histories are used to determine when and/or whether to transmit given location data 650 to device 101, device 101 need not be registered to received given location data 650. In any event, it is appreciated that the transmitted given location data 650 would offer relevant material (including but not limited to as advertisements) associated with the closest associated locations and/or entities.

In yet further implementations, server 105 is further enabled to: receive, via interface 164, search parameter data from device 101 and perform a search based on the search parameter data to produce search results data. In these implementations, the given ETA is from current location 20 of device 101 and the geographic boundaries of the geofence data surround current location 20 device 101. The search results data comprises the given location data, the search results data comprising only results associated with given locations within geographic boundaries associated with the geofence data, including the given location.

Figure 7:
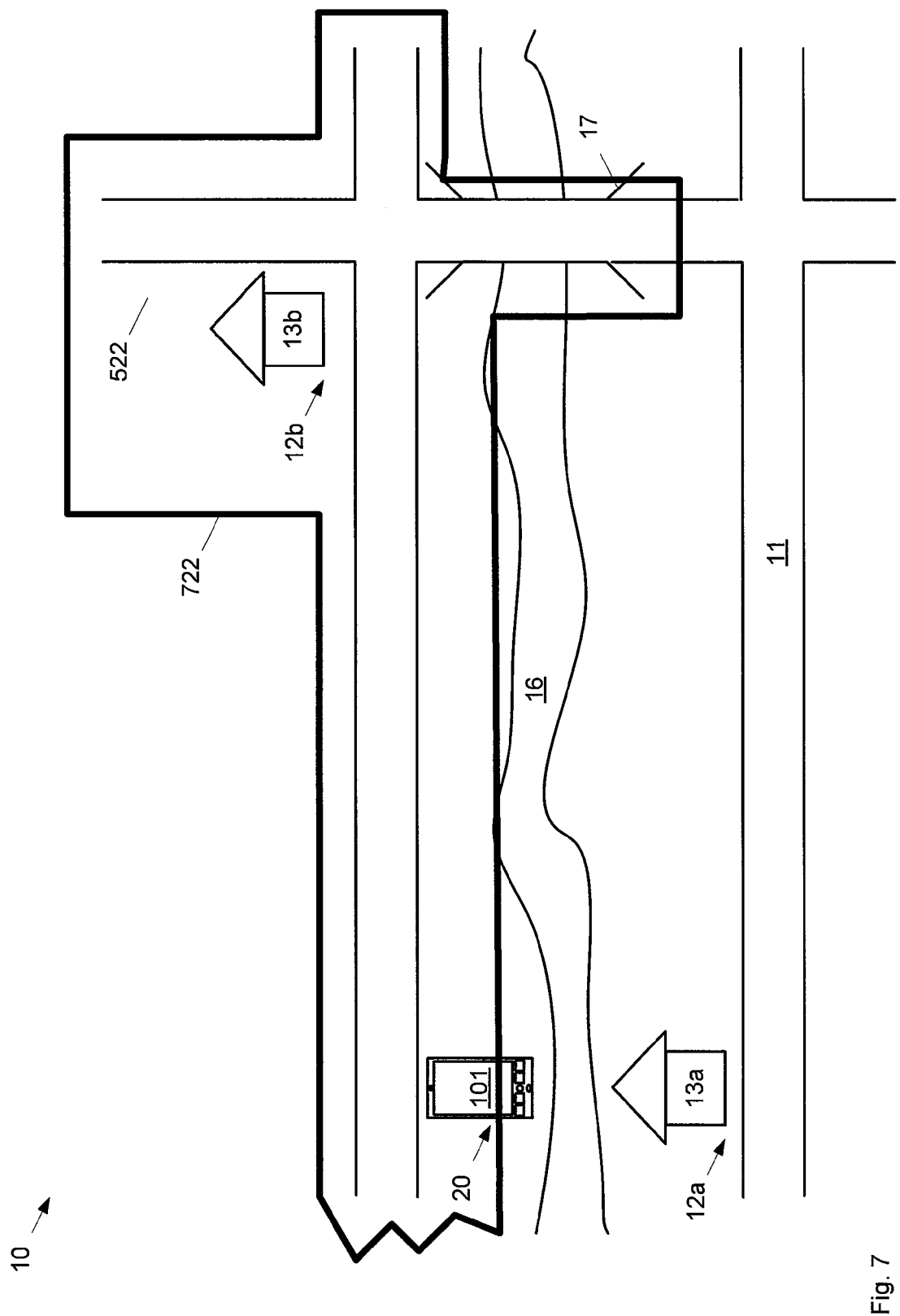
FIG. 7 depicts a map including a geofence based on estimated time of arrival, according to non-limiting implementations.
Figure 8:
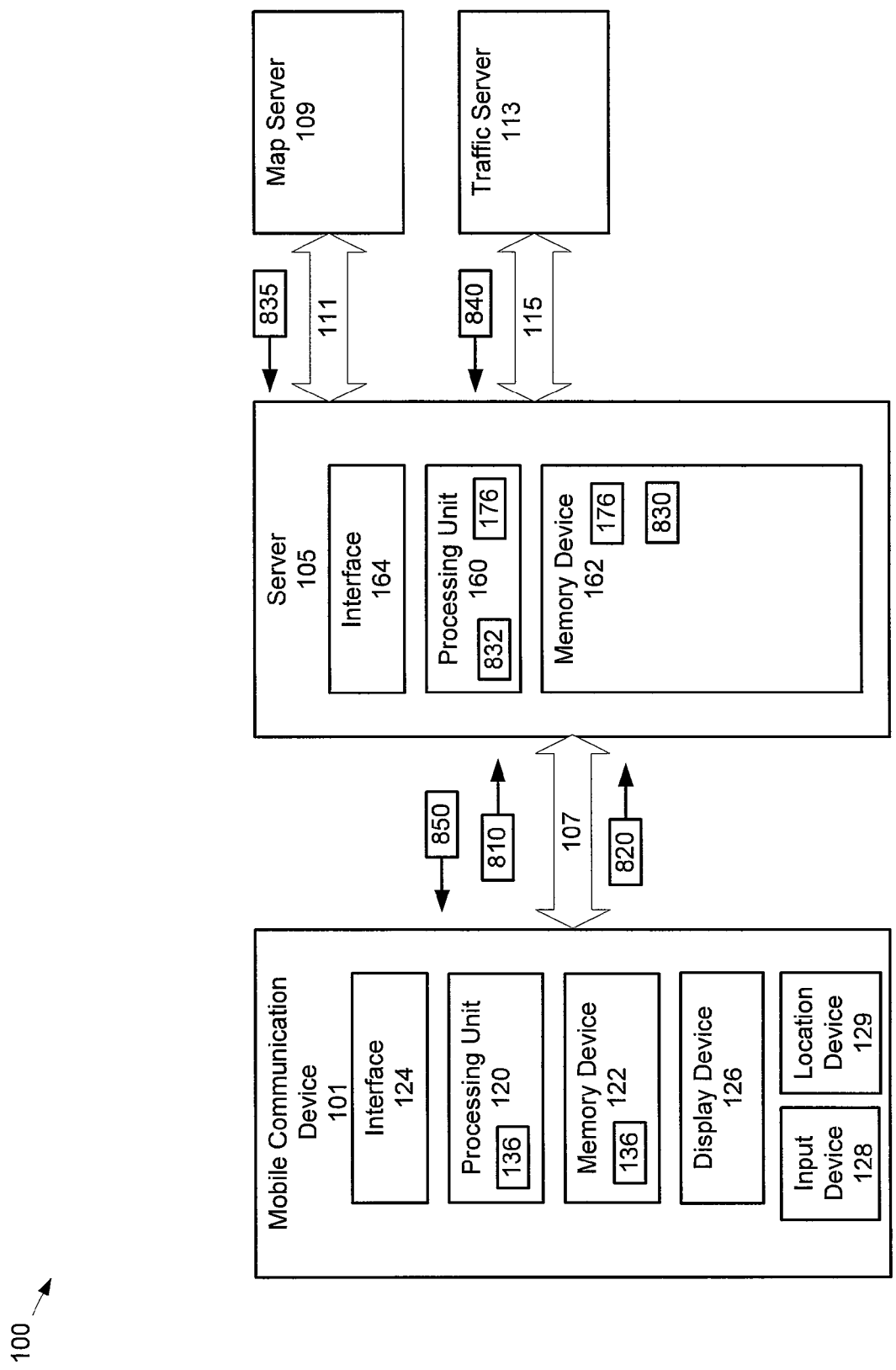
FIG. 8 depicts a system for determining geofence data based on estimated time of arrival, according to non-limiting implementations.

To illustrate these implementations, attention is directed to FIGS. 7 and 8 which illustrate search implementations, wherein search results are associated with ETA based geofence data. FIG. 7 is substantially similar to FIG. 1, with like elements having like numbers, however an ETA-based geofence 722 is provided around location 20. It appreciated that the full geographic boundaries of geofence 722 are not depicted in FIG. 7, but extend past the depicted jagged lines of geofence 722. In any event, geofence 722 represents the geographic boundaries of where device 101 could be transported from location 20 within a given estimated time period, such as 5 minutes.

With reference, to FIG. 8, which is substantially similar to FIG. 2, with like elements having like numbers, server 105 can be enabled to receive search parameter data 810 from device 101 via link 107, as well as current location data 820, similar to current location data 660. Search parameter data 810 comprises data to be searched, such as text data for searching for entities 13. Search parameter data 810 can optionally comprise given ETA data, for example "5 minutes", indicating that only entities within a given ETA are to be provided in search results. While depicted separately in FIG. 8, data 810, 820 can be bundled together for transmission.

Server 105 receives search parameter data 810 and current location data 820, and performs a search (e.g. via search server, not depicted) to obtain search results 830 which are optionally stored at memory 162, as depicted. In the present example, it is assumed that search results 830 comprise identifiers of entities 13 and respective locations 12.

Server 105 further determines geofence data 832 by retrieving map data 835 and traffic data 840 from map server 109 and traffic server 113, respectively, similar to the processes described above. In these implementations, however, geofence data 832 is indicative of the geographic boundaries of geofence 722 of FIG. 7 surrounding location 20 where device 101 is located.

Hence, server 105 can then determine whether a given entity 13 in search results is inside or outside geofence 722. When one or more given entities are inside geofence 722 (i.e. entity 13*b*) search results data 850 is generated that comprise only results associated the one or more given entities. Search results data 850 omit those entities not inside geofence 722. Search results data 850 are transmitted back to device 101. In the depicted example, search results data 850 would comprise only an identifier of entity 13*b*, along with a respective location 12*b* and optionally an estimated time of arrival from location 20 to location 12*b*.

Alternatively, search results data 850 can include all entities 13 in search results 830, but sorted according to estimated time of arrival: e.g. Entity 13*b* at location 12*b*, 2 mins; Entity 13*a* at location 12*a*, 20 minutes.

In other words, search results data 850 comprises a subset of search results 830, search results data 850 being filtered based on geofence 722 and/or an respective ETAs to locations 13.

It is yet further appreciated that search results data 850 are transmitted to device 101 in a pull operation.

In other words, in these implementations, processing unit 160 is enabled to: receive, via interface 164, search parameter data from a communication device; determine a current location of the communication device; determine geofence data based on a given estimated time of arrival (ETA) from the current location; perform a search based on the search parameter data to produce search results data; and transmit, via interface 164, to the communication device the search results data, wherein the search results data comprises only results associated with given locations within geographic boundaries associated with the geofence data such that the given communication device is transportable between the current location and the given locations within the given estimated time of arrival. Alternatively, the search results data can be ordered based on a respective estimated times of arrival between the communication device and each location.

It is yet further appreciated that geofence boundaries described herein are generally polygons and not circles as they are based on estimated times of arrival along roads etc., and that the boundaries of the polygons can be adjusted dynamically based on traffic conditions.

Other implementations of ETA based geofencing are within the scope of present implementations. For example, when a user having a device similar to device 101 desires a ride from an acquaintance, the device can initiate a search at a server, such as server 105, for locations of acquaintances within a given ETA based geofence (assuming a location of each acquaintance can be determined by the server). The server can then return search results of acquaintances that are within the given ETA based geofence (e.g. within a 5 minute drive or the like), and/or the results can be sorted according to ETA of each acquaintance.

While implementations heretofore have been described with respect to traffic conditions, it is appreciated that ETA based geofencing can also be based on walking conditions and/or conditions of a transportation system (e.g. buses subways).

In any event, by using ETA based geofencing when transmitting location based data, such as offer data, and/or when sorting/limiting search results, more accurate targeting of devices and/or searching can occur.

Those skilled in the art will appreciate that in some implementations, the functionality of device 101, server 105, map server 109 and traffic server 113 can be implemented using pre-programmed hardware or firmware elements (e.g., application specific integrated circuits (ASICs), electrically erasable programmable read-only memories (EEPROMs), etc.), or other related components. In other implementations, the functionality of device 101, server 105, map server 109 and traffic server 113 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A computing device comprising:
   a memory;
   a communication interface enabled to communicate with a handheld communication device; and
   a processor enabled to:
      determine geofence data, wherein geographic boundaries associated with the geofence data are based on a given estimated time of arrival (ETA) along roads from one of a given location and a current location of the handheld communication device so that the geographic boundaries comprise a polygon with sides that extend along the roads; and
      transmit to the handheld communication device, via the communication interface, given location data associated with the given location when the current location of the handheld communication device and the given location are each within the geographic boundaries such that the handheld communication device is transportable to the given location within the given estimated time of arrival.

2. The computing device of claim 1, wherein:
   the given ETA is from the given location,
   the geographic boundaries of the geofence data surround the given location, and
   the given location data associated with the given location is transmitted to the handheld communication device when the current location of the communication device is within the geographic boundaries.

3. The computing device of claim 2, wherein the memory stores registration data associated with the handheld communication device, the processor further enabled to transmit the given location data to the handheld communication device only when the registration data is indicative that the handheld communication device is registered to receive data associated with the given location.

4. The computing device of claim 3, wherein the given location data comprises offer data associated with the given location.

5. The computing device of claim 1, wherein the processor is further enabled to transmit to the handheld communication device, via the communication interface, the given location data in a push operation.

6. The computing device of claim 1, wherein the processor is further enabled to:
   receive, via the communication interface, search parameter data from the handheld communication device; and
   perform a search based on the search parameter data to produce search results data, wherein,
   the given ETA is from the current location of the handheld communication device,
   the geographic boundaries of the geofence data surround the current location of the handheld communication device, and
   the search results data comprises the given location data, the search results data comprising only results associated with given locations within geographic boundaries associated with the geofence data, including the given location.

7. The computing device of claim 6, wherein the search results data are sorted according to a respective ETA associated with each of the given locations.

8. The computing device of claim 1, wherein the processor is further enabled to transmit to the handheld communication device, via the communication interface, the search results data in a pull operation.

9. The computing device of claim 1, wherein the geographic boundaries are based on one or more of present traffic conditions, historical traffic conditions, data received from a map server, and data received from a traffic server.

10. A method comprising:
    determining geofence data, at a computing device in communication with a handheld communication device, wherein geographic boundaries associated with the geofence data are based on a given estimated time of arrival (ETA) along roads from one of a given location and a current location of the handheld communication device so that the geographic boundaries comprise a polygon with sides that extend along the roads; and
    transmitting to the handheld communication device, via a communication interface at the computing device, given location data associated with the given location when the current location of the handheld communication device and the given location are each within the geographic boundaries such that the handheld communication device is transportable to the given location within the given estimated time of arrival.

11. The method of claim 10, wherein:
    the given ETA is from the given location,
    the geographic boundaries of the geofence data surround the given location, and
    the given location data associated with the given location is transmitted to the handheld communication device when the current location of the communication device is within the geographic boundaries.

12. The method of claim 11, wherein a memory of the computing device stores registration data associated with the handheld communication device, the method further comprising transmitting the given location data to the handheld communication device only when the registration data is indicative that the handheld communication device is registered to receive data associated with the given location.

13. The method of claim 12, wherein the given location data comprises offer data associated with the given location.

14. The method of claim 10, further comprising transmitting to the handheld communication device, via the communication interface, the given location data in a push operation.

15. The method of claim 10, further comprising:
    receiving, via the communication interface, search parameter data from the handheld communication device; and
    performing a search based on the search parameter data to produce search results data, wherein,
    the given ETA is from the current location of the handheld communication device,
    the geographic boundaries of the geofence data surround the current location of the handheld communication device, and
    the search results data comprises the given location data, the search results data comprising only results associated with given locations within geographic boundaries associated with the geofence data, including the given location.

16. The method of claim 15, wherein the search results data are sorted according to a respective ETA associated with each of the given locations.

17. The method of claim 10, further comprising transmitting to the handheld communication device, via the communication interface, the search results data in a pull operation.

18. The method of claim 10, wherein the geographic boundaries are based on one or more of present traffic conditions, historical traffic conditions, data received from a map server, and data received from a traffic server.

19. A computer program product, comprising a non-transitory computer usable medium having a computer readable program code adapted to be executed to implement a method comprising:

determining geofence data, at a computing device in communication with a handheld communication device, wherein geographic boundaries associated with the geofence data are based on a given estimated time of arrival (ETA) along roads from one of a given location and a current location of the handheld communication device so that the geographic boundaries comprise a polygon with sides that extend along the roads; and transmitting to the handheld communication device, via a communication interface at the computing device, given location data associated with the given location when the current location of the handheld communication device and the given location are each within the geographic boundaries such that the handheld communication device is transportable to the given location within the given estimated time of arrival.

* * * * *